(12) United States Patent
Ly

(10) Patent No.: US 8,638,010 B2
(45) Date of Patent: Jan. 28, 2014

(54) SYSTEMS, DEVICES, AND METHODS FOR PROVIDING BACKUP POWER TO A LOAD

(75) Inventor: Wallace Ly, San Jose, CA (US)

(73) Assignee: Integrated Device Technology, inc., San Jose, CA (US)

( * ) Notice: Subject to any disclaimer, the term of this patent is extended or adjusted under 35 U.S.C. 154(b) by 1017 days.

(21) Appl. No.: 12/707,576

(22) Filed: Feb. 17, 2010

(65) Prior Publication Data

US 2011/0198931 A1 Aug. 18, 2011

(51) Int. Cl.
*H02M 3/06* (2006.01)

(52) U.S. Cl.
USPC .......................................................... 307/109

(58) Field of Classification Search
USPC .......................................................... 307/109
See application file for complete search history.

(56) References Cited

U.S. PATENT DOCUMENTS

| | | | |
|---|---|---|---|
| 6,995,483 B2 | 2/2006 | Kohout et al. | |
| 7,596,657 B2 | 9/2009 | Kaler | |
| 7,786,620 B2 * | 8/2010 | Vuk et al. | 307/66 |
| 2004/0103238 A1 * | 5/2004 | Avraham et al. | 711/102 |
| 2005/0188149 A1 | 8/2005 | Kaler | |
| 2007/0033431 A1 | 2/2007 | Pecone et al. | |
| 2008/0147968 A1 | 6/2008 | Lee et al. | |
| 2008/0195801 A1 | 8/2008 | Cheon et al. | |
| 2008/0235441 A1 | 9/2008 | Sherman | |
| 2008/0263305 A1 | 10/2008 | Shu et al. | |
| 2009/0083476 A1 | 3/2009 | Pua et al. | |
| 2009/0086511 A1 | 4/2009 | Lin | |
| 2009/0094433 A1 | 4/2009 | Thomas et al. | |
| 2009/0102440 A1 | 4/2009 | Coles | |
| 2009/0193182 A1 | 7/2009 | Nitta | |
| 2009/0193189 A1 | 7/2009 | Carswell et al. | |
| 2009/0206657 A1 | 8/2009 | Vuk et al. | |
| 2009/0235038 A1 | 9/2009 | Satore | |

FOREIGN PATENT DOCUMENTS

WO 01/22205 A1 3/2001

OTHER PUBLICATIONS

PCT Search Report for PCT/US2011/025329, mailed Nov. 28, 2011, 5 pages.
PCT Written Opinion for PCT/US2011/025329, mailed Nov. 28, 2011, 4 pages.

\* cited by examiner

*Primary Examiner* — Hal Kaplan
(74) *Attorney, Agent, or Firm* — Traskbeitt, P.C.

(57) ABSTRACT

Systems, devices, and methods for providing backup power to a load are disclosed. A power converter may comprise a capacitor array comprising a plurality of capacitors and configured to store a charge from an input during a charge mode of operation and provide a charge to an output during a discharge mode of operation. Further, the power converter may comprise a controller configured to selectively couple the capacitor array to the input during a portion of the charge mode of operation and selectively couple the capacitor array to the output during a portion of the discharge mode of operation.

27 Claims, 10 Drawing Sheets

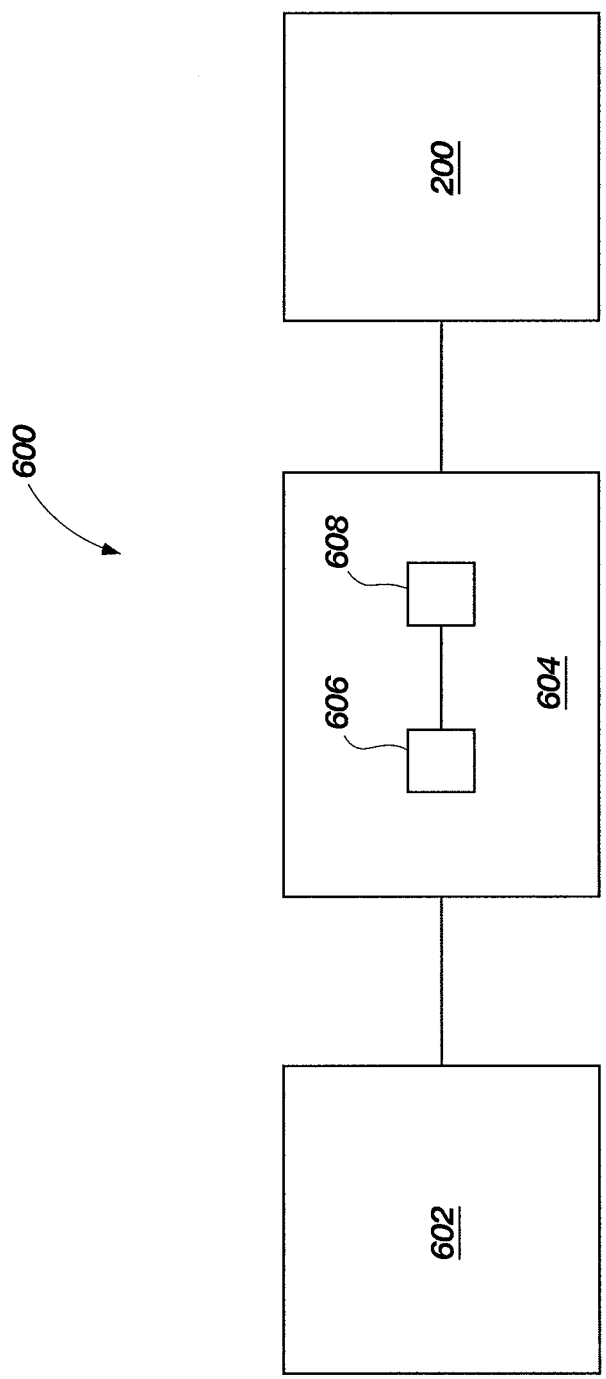

SYSTEMS, DEVICES, AND METHODS FOR PROVIDING BACKUP POWER TO A LOAD

TECHNICAL FIELD

Embodiments of the present disclosure relate generally to power conversion and, more particularly, to systems, devices and methods for providing backup power to a load.

BACKGROUND

Non-volatile memory is common to virtually all computer systems. Examples of non-volatile memory include read-only memory, flash memory, magnetic computer storage devices (e.g. hard disks, floppy disks, and magnetic tape), and optical discs. A downside of non-volatile storage is that it is relatively slow to access compared to volatile forms of memory, such as DRAM (Dynamic Random Access Memory). Thus, virtually all computer systems also include volatile memory that temporarily stores data for faster access. Conventionally, code for executing application programs and data recently used by active applications are stored to, and retrieved from, the non-volatile storage and stored in the volatile memory for faster access. As understood by a person having ordinary skill in the art, information stored in a memory cell of a non-volatile memory is preserved when a power supply voltage applied to the memory cell is interrupted or turned off. In contrast, information stored in a memory cell of a volatile memory is completely lost when the power supply voltage applied to the memory cell is interrupted or turned off.

Cache memory, which is typically a volatile memory, is a temporary storage area where frequently accessed data can be stored for rapid access. While cache memory is useful during memory access, problems may occur during a sudden loss in power. When a computer system detects a pending power problem, the computer system generally needs to prepare itself for the power loss by "flushing" the cache memory. Cache flushing refers to a method in which a computer system writes data stored in cache memory to non-volatile memory. If power is lost before the data is written, the data is lost. Accordingly, to ensure reliability of a storage device and to prevent data corruption, it is critical that sufficient battery power be maintained so that data stored in cache memory may be written to non-volatile memory.

Furthermore, even if cache memory is embodied in non-volatile memory (e.g., flash memory), in the event of power interruption, some or all of the contents of the flash memory may need to be written to a disk drive or other storage to maintain coherency of data at the various storage locations.

Conventionally, in an event of a power loss, computer systems have employed super capacitors to provide backup power to enable for data within a cache memory to be flushed to non-volatile memory. However, super capacitors are expensive and may undesirably increase the physical size of an electronic device.

There is a need for methods, systems, and devices to enhance operation of an electronic device. Specifically, there is a need for systems, methods, and devices for providing adequate backup power to a data storage device in the event of a power loss to enable the data storage device to complete one or more data operations.

BRIEF SUMMARY OF THE INVENTION

An embodiment of the present invention includes a power converter. The power converter comprises a capacitor array comprising a plurality of capacitors and is configured to store a charge from an input during a charge mode of operation. The power converter is further configured to provide a charge to an output during a discharge mode of operation. Additionally, the power converter includes a controller configured to selectively couple the capacitor array to the input during a portion of the charge mode of operation and selectively couple the capacitor array to the output during a portion of the discharge other mode of operation.

Another embodiment of the present invention includes a method that comprises receiving an input voltage at each of a load and a power converter at a first voltage level and charging a capacitor array within the power converter to a second voltage level greater than the first voltage level. The method further includes conveying an output voltage from the power converter to the load at a third voltage level less than the second voltage level upon detection of a loss of power supplied to the load.

Another embodiment of the present invention includes a method that comprises storing energy from an input in a capacitor array having a plurality of capacitors during a first stage. The method further includes outputting the energy stored in the capacitor array to a load during a second stage upon detection of a loss of power at the input.

Yet another embodiment of the present invention includes a system that includes an electronic device, a data storage device coupled to the electronic device, and a power converter. The power converter may be operably coupled to the data storage device and may be configured to store energy in a capacitor array during a first phase and convey the energy stored in the capacitor array to the data storage device during a second phase.

BRIEF DESCRIPTION OF THE SEVERAL VIEWS OF THE DRAWINGS

FIG. 15 is a block diagram illustrating a system including a power converter operably coupled to a data storage device, in accordance with an embodiment of the present invention.

DETAILED DESCRIPTION

In this description, circuits and functions may be shown in block diagram form in order not to obscure the present invention in unnecessary detail. Conversely, specific circuit implementations shown and described are exemplary only and should not be construed as the only way to implement the present invention, unless specified otherwise herein. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations, and the like, have been omitted where such details are not necessary to obtain a complete understanding of the present invention and are within the abilities of persons of ordinary skill in the relevant art.

In this description, some drawings may illustrate signals as a single signal for clarity of presentation and description. It will be understood by a person of ordinary skill in the art that the signal may represent a bus of signals, wherein the bus may have a variety of bit widths and embodiments of the present invention may be implemented on any number of data signals including a single data signal.

The terms "assert" and "negate" are respectively used when referring to the rendering of a signal, status bit, or similar apparatus into its logically true or logically false state. If the logically true state is a logic level one, the logically false state will be a logic level zero. Conversely, if the logically true state is a logic level zero, the logically false state will be a logic level one.

Also, it is noted that particular embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process is terminated when its acts are completed. A process may correspond to a method, a function, a procedure, a subroutine, a subprogram, etc. Furthermore, the methods disclosed herein may be implemented in hardware, software, or both.

Figure 1:
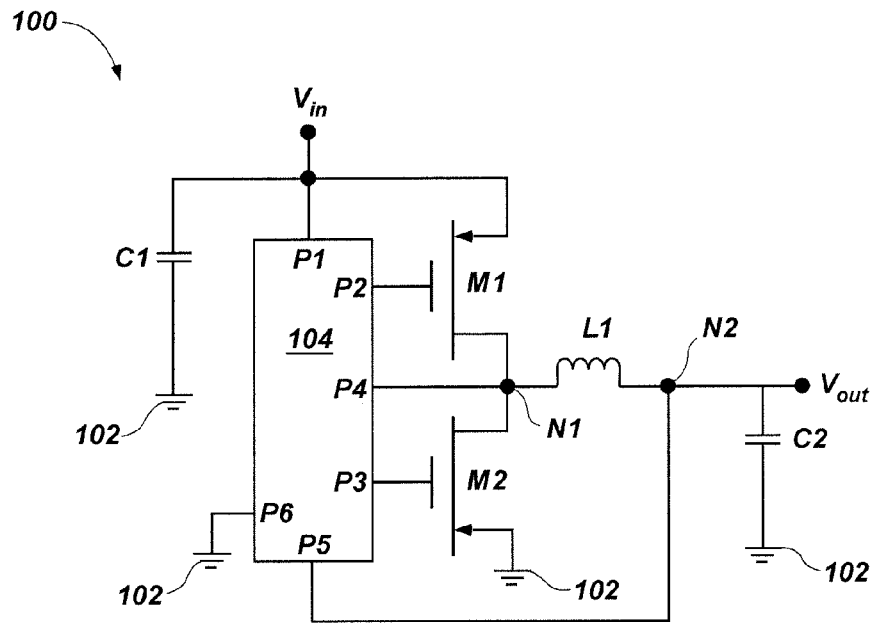
FIG. 1 illustrates a switching buck converter.
Figure 4:
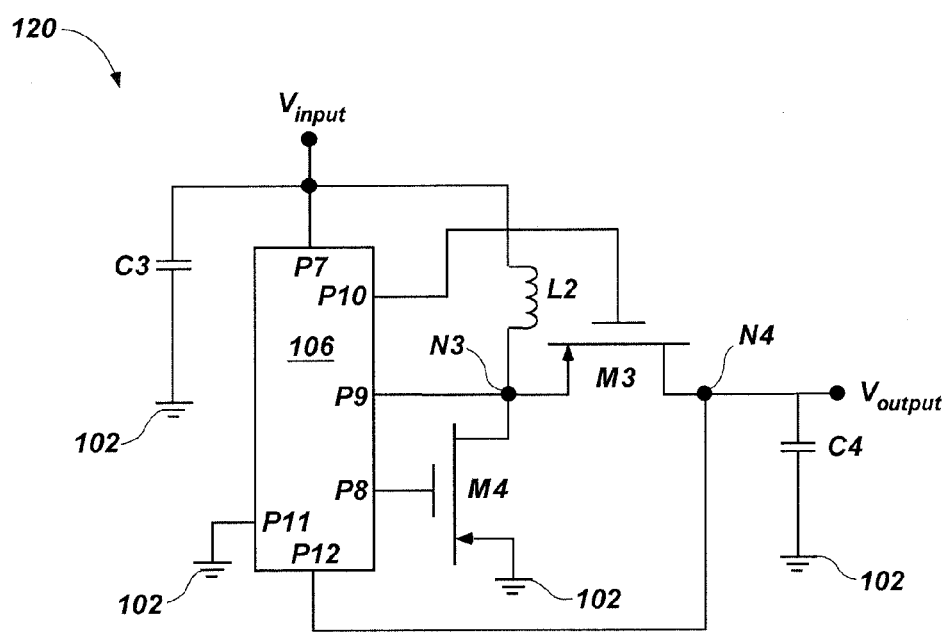
FIG. 4 illustrates the switching buck converter of FIG. 1 in an output phase.

FIGS. 1 and 4 respectively illustrate a switching buck converter 100 and a switching boost converter 120, each of which will be understood by a person having ordinary skill in the art. With reference to FIG. 1, switching buck converter 100 includes a capacitor C1 operably coupled between a ground voltage 102 and an input voltage Vinput, which is operably coupled to a pin P1 of a buck converter driver 104. Switching buck converter 100 also includes a first transistor M1 having a source operably coupled to input voltage Vinput and a drain operably coupled to a drain of a second transistor M2. A gate of transistor M1 is operably coupled to a pin P2 of buck converter driver 104. Further, a source of transistor M2 is operably coupled to ground voltage 102 and a gate of transistor M2 is operably coupled to a pin P3 of buck converter driver 104. Switching buck converter 100 further includes an inductor L1 operably coupled between a pin P4 of buck converter driver 104 and a capacitor C2, which is further coupled to ground voltage 102. As illustrated, pin P4 of buck converter driver 104 is also coupled to the drain of transistor M1 and the drain of transistor M2 at a node N1. Additionally, a pin P6 of buck converter driver 104 is coupled to ground voltage 102 and a pin P5 of buck converter driver 104, which may also be referred to as a feedback pin, is operably coupled to a node N2 to sense an output voltage Voutput.

Figure 2:
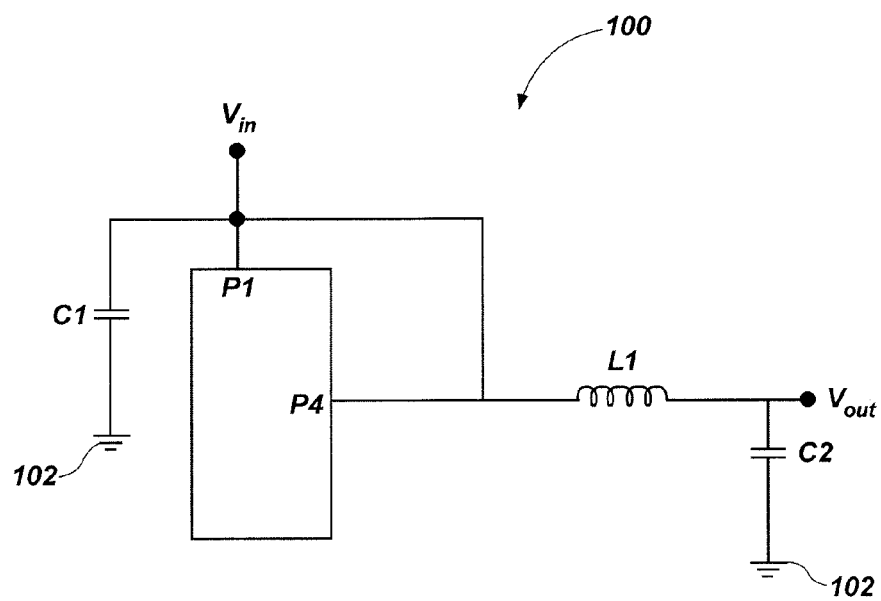
FIG. 2 illustrates a switching boost converter.
Figure 3:
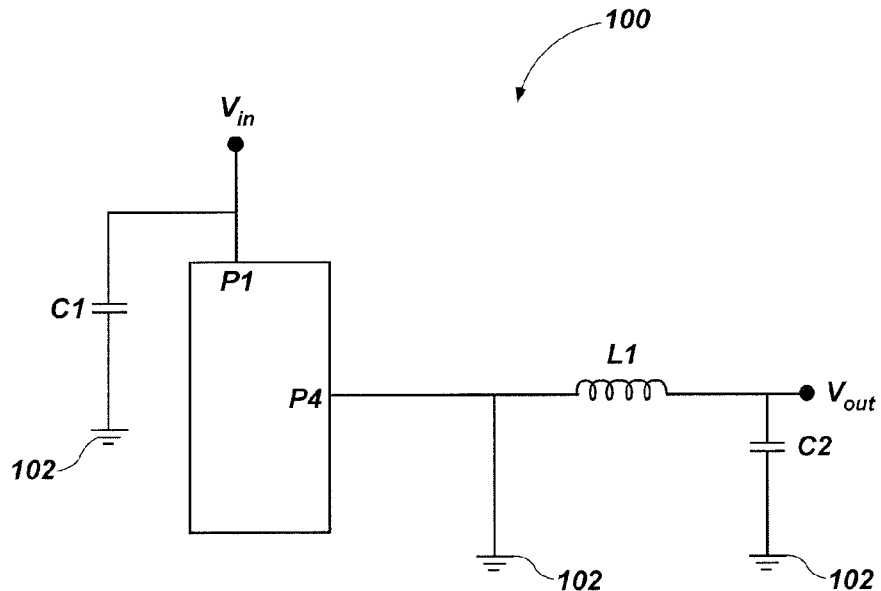
FIG. 3 illustrates the switching buck converter of FIG. 1 in a charging phase.

As will be understood by a person having ordinary skill in the art, a switching buck converter (e.g., switching buck convertor 100) may alternate between two configurations to output a voltage that is decreased or "bucked" relative to an input voltage. More specifically, in a charging phase, a switching buck converter may connect an inductor to a changing input voltage to charge the inductor and, thereafter, in an output phase, may discharge the energy from the inductor to an output. FIG. 2 illustrates switching buck converter 100 in a charging phase wherein transistor M1 (see FIG. 1) switches to a conductive state, transistor M2 (see FIG. 1) is in a non-conductive state and, therefore, inductor L1 may be coupled to input voltage Vinput and charged by the transition on node N1. FIG. 3 illustrates switching buck converter 100 in an output phase wherein transistor M1 (see FIG. 1) is in a non-conductive state, transistor M2 (see FIG. 1) is in a conductive state and, therefore, the energy stored within inductor L1 may be transferred to capacitor C2. As mentioned above and as will be understood by a person having ordinary skill in the art, output voltage Voutput will be "bucked" with respect to input voltage Vinput.

With reference to FIG. 4, switching boost converter 120 includes a capacitor C3 operably coupled between ground voltage 102 and input voltage Vinput, which is operably coupled to a pin P7 of a boost converter driver 106. Switching boost converter 100 also includes an inductor L2 operably coupled between input voltage Vinput and a drain of a transistor M4. Further, a source of transistor M4 is operably coupled to ground voltage 102 and a gate of transistor M4 is operably coupled to a pin P8 of boost converter driver 106. Switching boost converter 120 further includes a transistor M3 having a source operably coupled to a pin P9 of boost converter driver 106 and a drain operably coupled to a capacitor C4, which is further coupled to ground voltage 102. A gate of transistor M3 is operably coupled to a pin P10 of boost converter driver 106. Pin P9 of boost converter driver 106 is also coupled to the drain of transistor M4 and inductor L2 at a node N3. Additionally, a pin P11 of boost converter driver 106 is coupled to ground voltage 102 and a pin P12 of boost converter driver 106, which may also be referred to as a feedback pin, is operably coupled to a node N4 to sense an output voltage Voutput.

Figure 5:
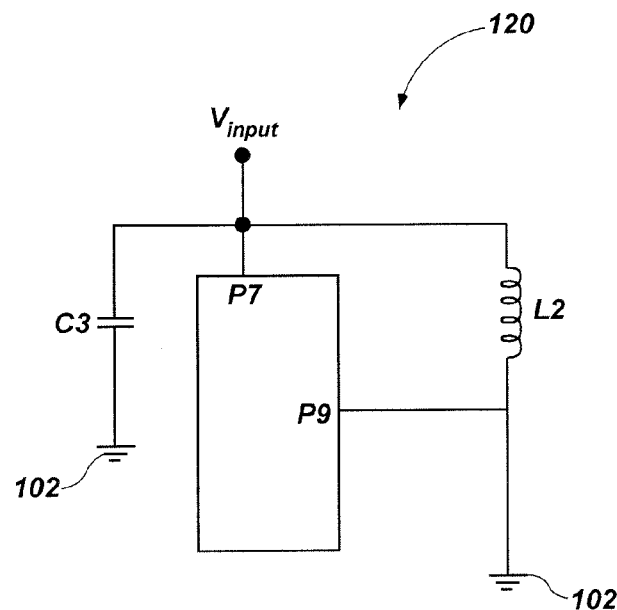
FIG. 5 illustrates the switching boost converter of FIG. 2 in a charging phase.
Figure 6:
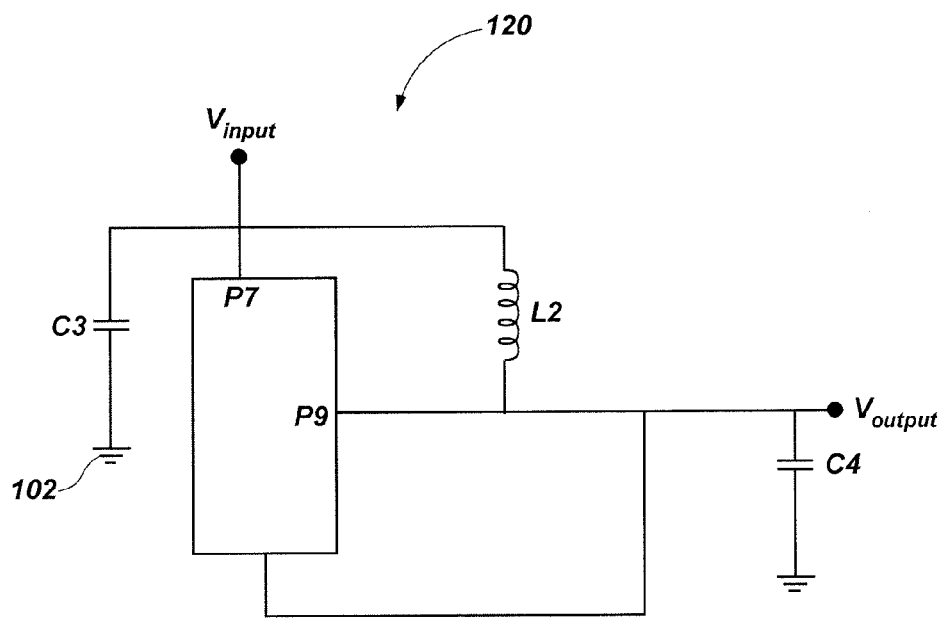
FIG. 6 illustrates the switching boost converter of FIG. 2 in a output phase.

As will be understood by a person having ordinary skill in the art, a switching boost converter (e.g. switching boost convertor 120) may alternate between two configurations to output a voltage that is increased or "boosted" relative to an input voltage. More specifically, in a charging phase, a switching boost converter may couple an inductor to an input voltage to charge the inductor and, thereafter, in an output phase, may couple the inductor between the input voltage and an output. FIG. 5 illustrates boost converter 120 in a "charging phase" wherein transistor M3 (see FIG. 4) is in a non-conductive state, transistor M4 (see FIG. 4) is switched to a conductive state and, therefore, inductor L2 may be coupled between ground voltage 102 and input voltage Vinput and charged by the switching of transistor M4. FIG. 6 illustrates boost converter 120 in an "output phase" wherein transistor M3 (see FIG. 4) is in a conductive state, transistor M4 (see FIG. 4) is in a non-conductive state and, therefore, the energy stored within inductor L2 may be transferred to capacitor C4. As mentioned above and as will be understood by a person having ordinary skill in the art, output voltage Voutput will be "boosted" with respect to input voltage Vinput.

Particular embodiments of the present invention use a single system to create a boost mode to charge a capacitor array at a high voltage, while a power input is supplied to the system. These embodiments may also create a buck mode to discharge the high voltage on the capacitor array back to the lower voltage power input when power is interrupted from being received by the system. Thus, the boost mode may be referred to herein as a charging boost mode and the buck mode may be referred to herein as a discharging buck mode.

Figure 7:
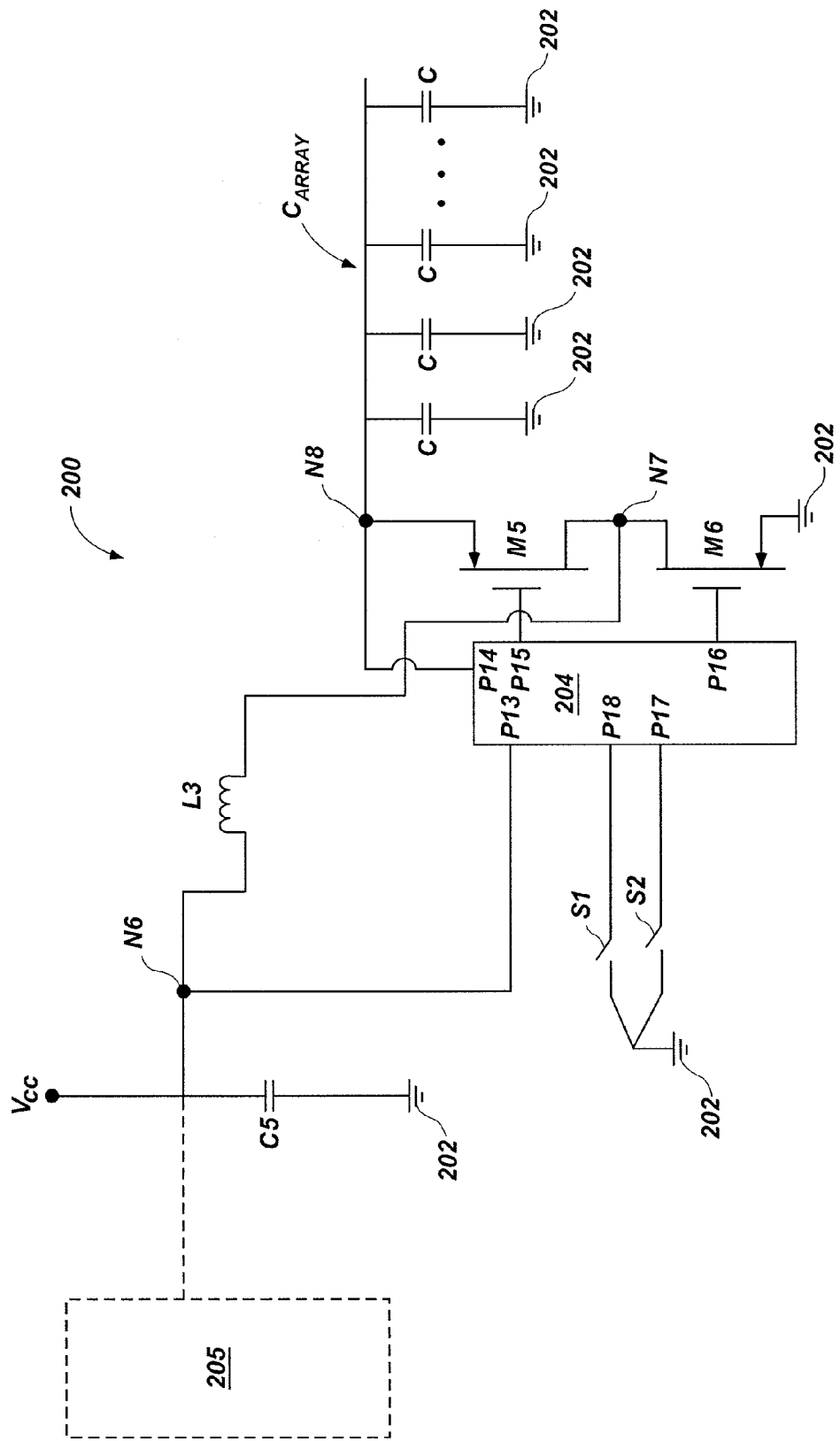
FIG. 7 illustrates a system including a power converter, according to an embodiment of the present invention.

FIG. 7 illustrates a power converter 200, in accordance with an exemplary embodiment of the present invention. As depicted in FIG. 7, power converter 200 may be configured for operable coupling to a load 205, which may comprise, for example only, a data storage device. Power converter 200 may include a capacitor C5 operably coupled between ground voltage 202 and an input voltage Vcc. By way of example only, according to one embodiment, input voltage Vcc may comprise a voltage of approximately 5 volts. According to another embodiment, input voltage Vcc may comprise a voltage of approximately 3.3 volts Furthermore, for example only, capacitor C5 may have a capacitance of substantially one microfarad (1 µF). A pin P13 of a controller 204 may be operably coupled to node N6 and may be configured to sense a voltage level at a node N6. Controller 204 may comprise a MOSFET driver that may be used as a step-up DC-to-DC converter and a step-down DC-to-DC converter. By way of example only, controller 204 may be a MOSFET driver of the type manufactured by Linear Technologies, Inc. of Milpitas Calif., under the model number LTC4442/-1. In one embodiment, controller 204 may be configured to draw less than two amps of current upon powering up and should exhibit a capacitance of less than one microfarad.

Power converter 200 also includes an inductor L3 operably coupled between node N6 and a node N7, which is operably coupled to a drain of a transistor M5 and a drain of a transistor M6. By way of example only, inductor L3 may have an inductance of substantially one microhenry (1 µH). Further, a source of transistor M5 may be operably coupled to a node N8, which is coupled between a pin P14 of controller 204 and a capacitor array $C_{Array}$, and which may comprise a plurality of capacitors C. It is noted that capacitor array $C_{Array}$ may comprise any suitable number of capacitors. By way of example only, capacitor array $C_{Array}$ may have a combined capacitance of substantially 800 microfarads. For example only, each capacitor C within capacitor array $C_{Array}$ may comprise any known and suitable off-the-shelf capacitor. Pin P14 may be configured to sense a voltage on the capacitor array $C_{Array}$ at node N8.

In addition, a gate of transistor M5 may be operably coupled to a pin P15 of controller 204. Controller 204 may be configured to convey a signal, via pin P15, to the gate of transistor M5 to cause transistor M5 to operate in either a conductive state or a non-conductive state. Furthermore, a gate of transistor M6 is operably coupled to a pin P16 of controller 204 and a source of transistor M6 is operably coupled to ground voltage 202. Controller 204 may be configured convey a signal, via pin P16, to the gate of transistor M6 to cause transistor M6 to operate in either a conductive state or a non-conductive state. Controller 204 further includes a pin P17 and a pin P18, wherein each of a pin P17 and pin P18 are configured for selective coupling to ground voltage 202, via respective switches S2 and S1.

A contemplated operation of power converter 200 will first be described with reference to FIG. 7. Thereafter, with reference to FIGS. 7-15, a more specific contemplated operation of power converter 200 will be described. In a contemplated operation, power converter 200 may operate in a "boost" mode, wherein power converter 200 may rapidly switch between two phases, a phase Φ1 of the charging boost mode and a phase Φ2 of the charging boost mode. During phase Φ1 of the charging boost mode, power converter 200 may charge inductor L3 with input voltage Vcc. Further, during phase Φ2 of the charging boost mode, power converter 200 may transfer the charge stored in inductor L3 to capacitor array $C_{Array}$. For example only, during the charging boost mode, power converter 200 may be configured to receive input voltage Vcc of substantially 5 volts and charge capacitor array $C_{Array}$ and node 8 to a voltage of substantially 22 volts.

Furthermore, in the contemplated operation, power converter 200 may operate in a "buck" mode, wherein power converter 200 may rapidly switch between two phases, a phase Φ3 of the buck mode and a phase Φ4 of the buck mode. Further, during phase Φ3 of the buck mode, power converter 200 may charge inductor L3 with energy stored within capacitor array $C_{Array}$. Further, during phase Φ4 of the buck mode, power converter 200 may transfer the charge stored in inductor L3 to load 205. By way of example only, during the buck mode, power converter 200 may be configured to receive a voltage from capacitor array $C_{Array}$ of substantially 22 volts and charge capacitor C5 to a voltage of substantially 5 volts.

According to one embodiment of the present invention, switch S1 and S2 may be controlled by a controller 610 (see FIG. 14), which is configured to sense a voltage at node N6 and a voltage at node N8. If the voltage at node N8 drops below a target level (e.g., 22 volts) and the voltage at node N6 is equal to or above a target level (e.g., 5 volts), then controller 610 may be configured to "open" switch S2 and "close" switch S1. Accordingly, pin P18 of controller 204 may be coupled to ground voltage 202, which may cause controller 204 to operate in a charging boost mode. Furthermore, upon detection of a power loss (i.e., if the voltage at node N6 drops below a target level, such as 5 volts), then controller 610 may be configured to "open" switch S1 and "close" switch S2. Accordingly, pin P17 of controller 204 may be coupled to ground voltage 202, which may cause controller 204 to operate in a buck mode. It is noted that according to another embodiment, controller 204 may be configured to sense a voltage at node N6 and a voltage at node N8. Furthermore, according to this embodiment, switch S1 and S2 may be controlled by controller 204 and, therefore, controller 610 may not be required.

Figure 8:
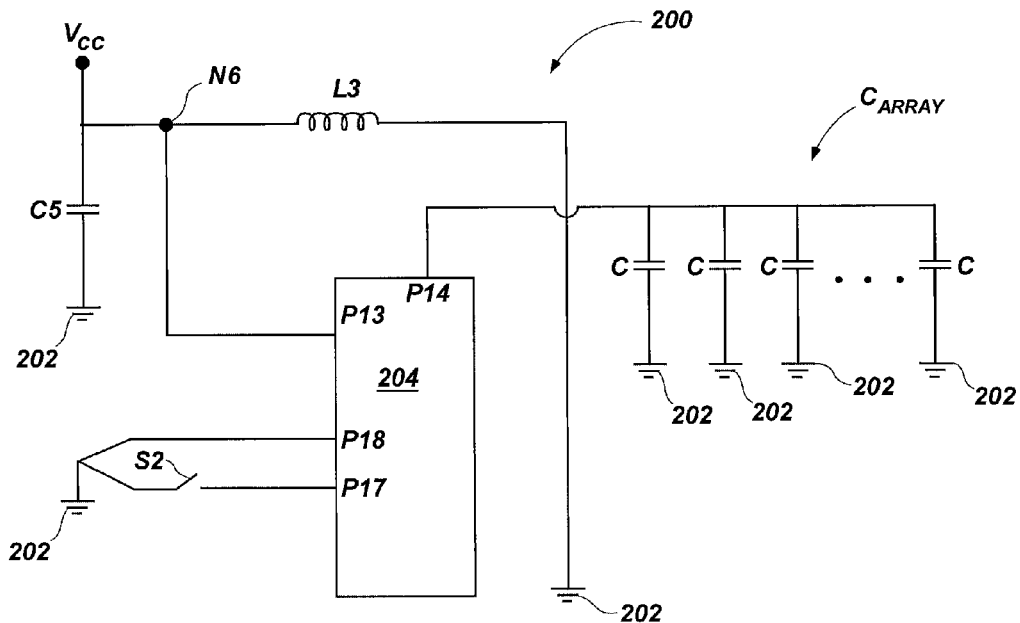
FIG. 8 illustrates the power converter of FIG. 7 in a phase of a charging boost mode, according to an embodiment of the present invention.

A more specific contemplated operation of power converter 200 will now be discussed with reference to FIGS. 7-15. Upon detection that a voltage at node N8 is below a target level (e.g., 22 volts) and a voltage at node N6 is above or equal to a target level (e.g., 5 volts), switch S2 may be opened and switch S1 may be closed. Accordingly, pin P18 of controller 204 may be coupled to ground voltage 202, which may cause controller 204 to operate in a charging boost mode. During phase Φ1 of a charging boost mode, pin P15 may supply a signal to the gate of transistor M5 to prevent transistor M5 from conducting and pin P16 may supply a signal to the gate of transistor M6 to cause transistor M6 to conduct. FIG. 8 illustrates power converter 200 in phase Φ1 of the charging boost mode wherein transistor M5 (see FIG. 7) is in a non-conductive state, transistor M6 (see FIG. 7) is in a conductive state and, therefore, inductor L3, which is coupled between node N6 and ground voltage 202, may be charged by input voltage Vcc.

Figure 9:
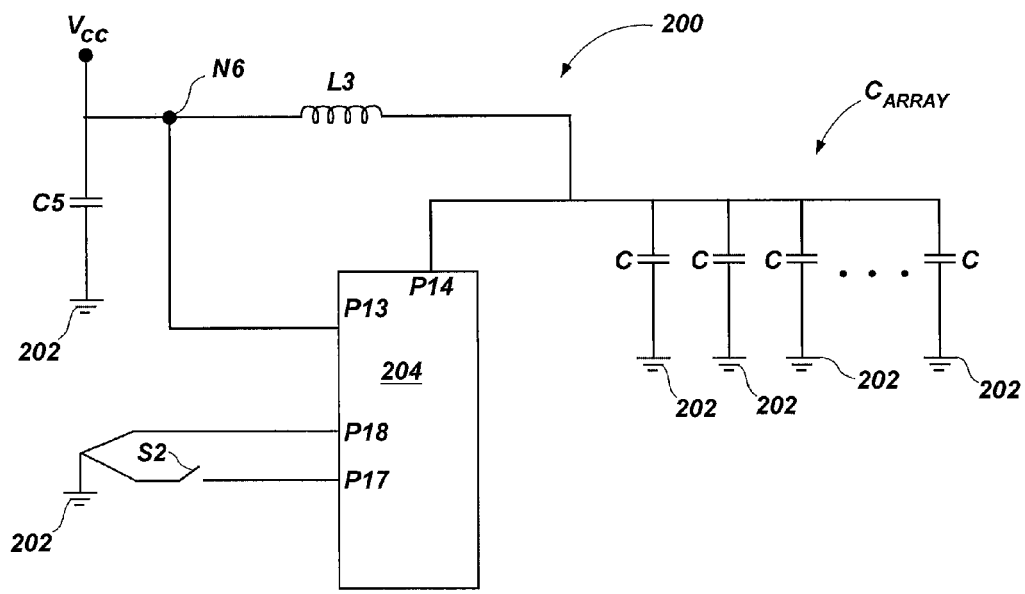
FIG. 9 illustrates the power converter of FIG. 7 in another phase of the charging boost mode, in accordance with an embodiment of the present invention.

Furthermore, during phase Φ2 of the charging boost mode, pin P15 may supply a signal to the gate of transistor M5 to cause transistor M5 to conduct and pin P16 may supply a signal to the gate of transistor M6 to prevent transistor M6 from conducting. FIG. 9 illustrates power converter 200 in phase Φ2 of the charging boost mode, wherein transistor M5 (see FIG. 7) is in a conductive state and transistor M6 (see FIG. 7) is in a non-conductive state. Therefore, the energy stored within inductor L3, which is coupled between node N6 and capacitor array $C_{Array}$, may be transferred to and stored within capacitor array $C_{Array}$.

Figure 12:
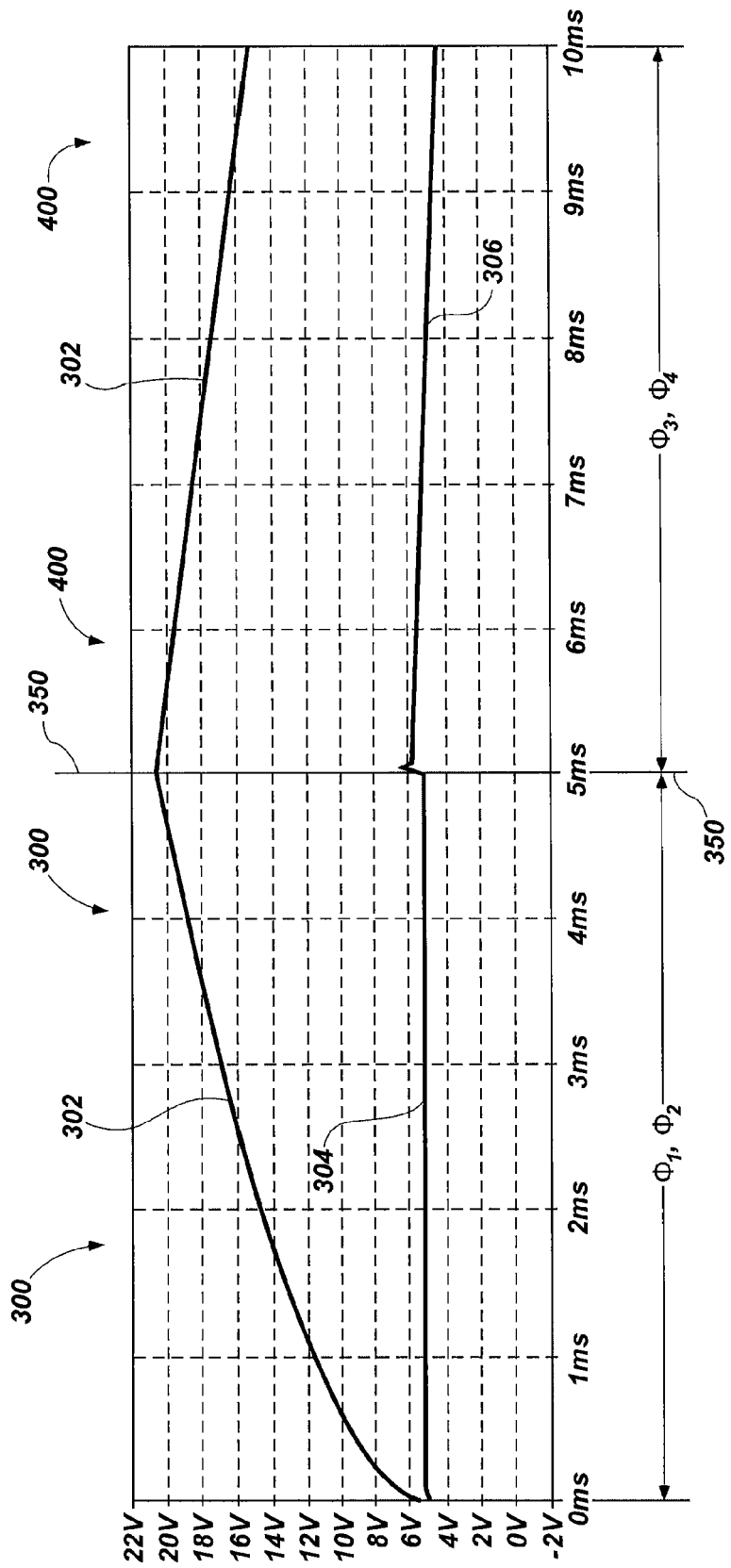
FIG. 12 illustrates a timing diagram depicting various example voltage levels associated with the power converter of FIG. 7.

FIG. 12 illustrates a timing diagram depicting various example voltage levels during a charging boost mode 300 (i.e., wherein power converter 200 rapidly switches between phase Φ1 and phase Φ2) and a buck mode 400 (i.e., wherein power converter 200 rapidly switches between phase Φ3 and phase Φ4). It is noted that reference numeral 350 illustrates a point in time wherein a loss of power has been detected and power converter 200 transitions from charging boost mode 300 to buck mode 400. A signal 304 depicts an input voltage received by power converter 200 during charging boost mode 300 (e.g. input voltage Vcc). Furthermore, it is noted that signal 304 also depicts a voltage level received by load 205 (see FIG. 7) during charging boost mode 300. In the illustrated example, signal 304 may have a voltage level of substantially 5 volts during charging boost mode 300. Further, a signal 302 depicts a voltage level of capacitor array $C_{Array}$ during charging boost mode 300. As illustrated by signal 302, a voltage level of capacitor array $C_{Array}$ rises to a voltage level of substantially 21 volts during the charging boost mode.

Figure 10:
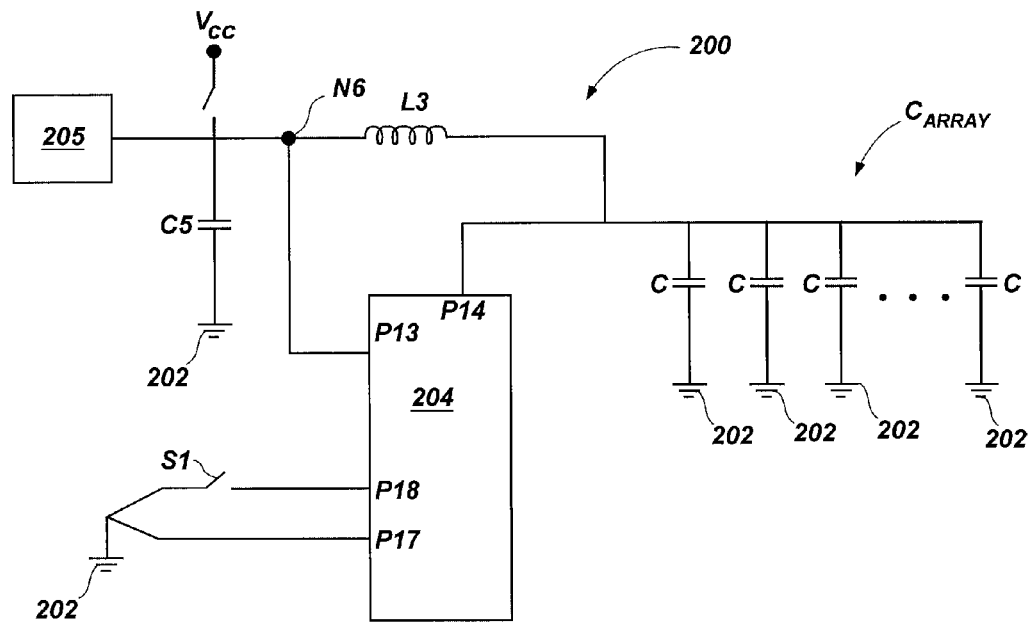
FIG. 10 illustrates the power converter of FIG. 7 in a phase of a discharging buck mode, in accordance with an embodiment of the invention.

Upon detection of a power loss (indicated by reference numeral 350) (i.e., a voltage at node N6 drops below a target level, such as 5 volts), switch S1 may be opened and switch S2 may be closed. Accordingly, pin P17 may be coupled to ground voltage 202, which may cause controller 204 to operate in a buck mode. During phase Φ3 of the buck mode, pin P15 may supply a signal to the gate of transistor M5 to cause transistor M5 to conduct and pin P16 may supply a signal to the gate of transistor M6 to prevent transistor M6 from conducting. FIG. 10 illustrates power converter 200 during phase Φ3 of the buck mode, wherein transistor M5 (see FIG. 7) is in a conductive state, transistor M6 (see FIG. 7) is in a non-conductive state and, therefore, the energy stored within capacitor array $C_{Array}$ may be transferred to inductor L3.

Figure 11:
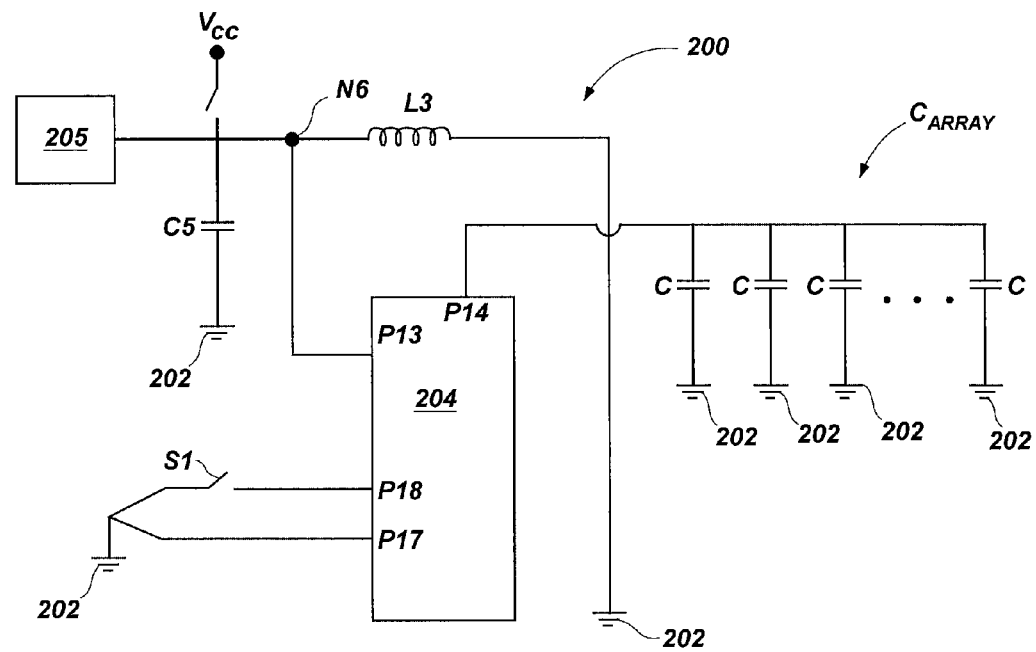
FIG. 11 illustrates the power converter of FIG. 7 in another phase of a discharging buck mode, according to an embodiment of the present invention.

Furthermore, during phase Φ4 of the buck mode, pin P15 may supply a signal to the gate of transistor M5 to prevent transistor M5 from conducting and pin P16 may supply a signal to the gate of transistor M6 to cause transistor M6 to conduct. FIG. 11 illustrates power converter 200 during phase Φ4 of the buck mode, wherein transistor M5 (see FIG. 7) is in a non-conductive state, transistor M6 (see FIG. 7) is in a conductive state and, therefore, the energy within inductor L3, which is coupled between ground voltage 202 and load 205, may be transferred to load 205.

As illustrated in FIG. 12, after detection of a power loss (indicated by reference numeral 350), signal 302, which depicts a voltage level of capacitor array $C_{Array}$, falls from substantially 21 volts to less than 16 volts in approximately 5 milliseconds (i.e., from 5 ms to 10 ms) as the buck mode 300 maintains about 5 volts on load 205 by discharging the capacitor array $C_{Array}$. Moreover, a signal 306 depicts an output voltage from power converter 200 during buck mode 300. It is noted that signal 306 also depicts a voltage level received by load 205 (see FIG. 7) during buck mode 400. As illustrated in FIG. 12, five milliseconds (as a non-limiting example) after detection of a power loss (indicated by reference numeral 350), a voltage of more than four volts is still being supplied to load 205.

Figure 13:
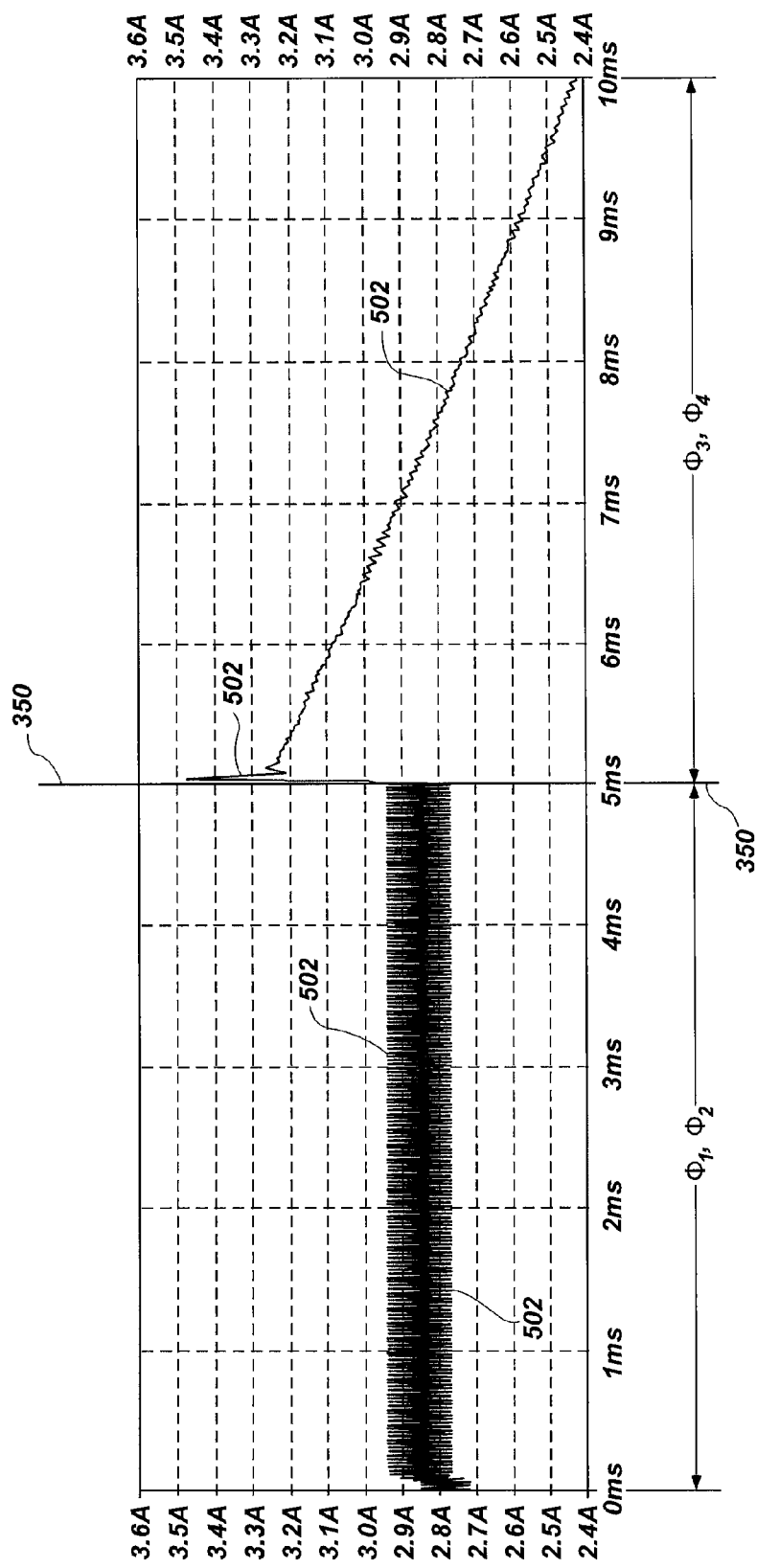
FIG. 13 illustrates another timing diagram depicting an example current level associated with the power converter of FIG. 7.
Figure 14:
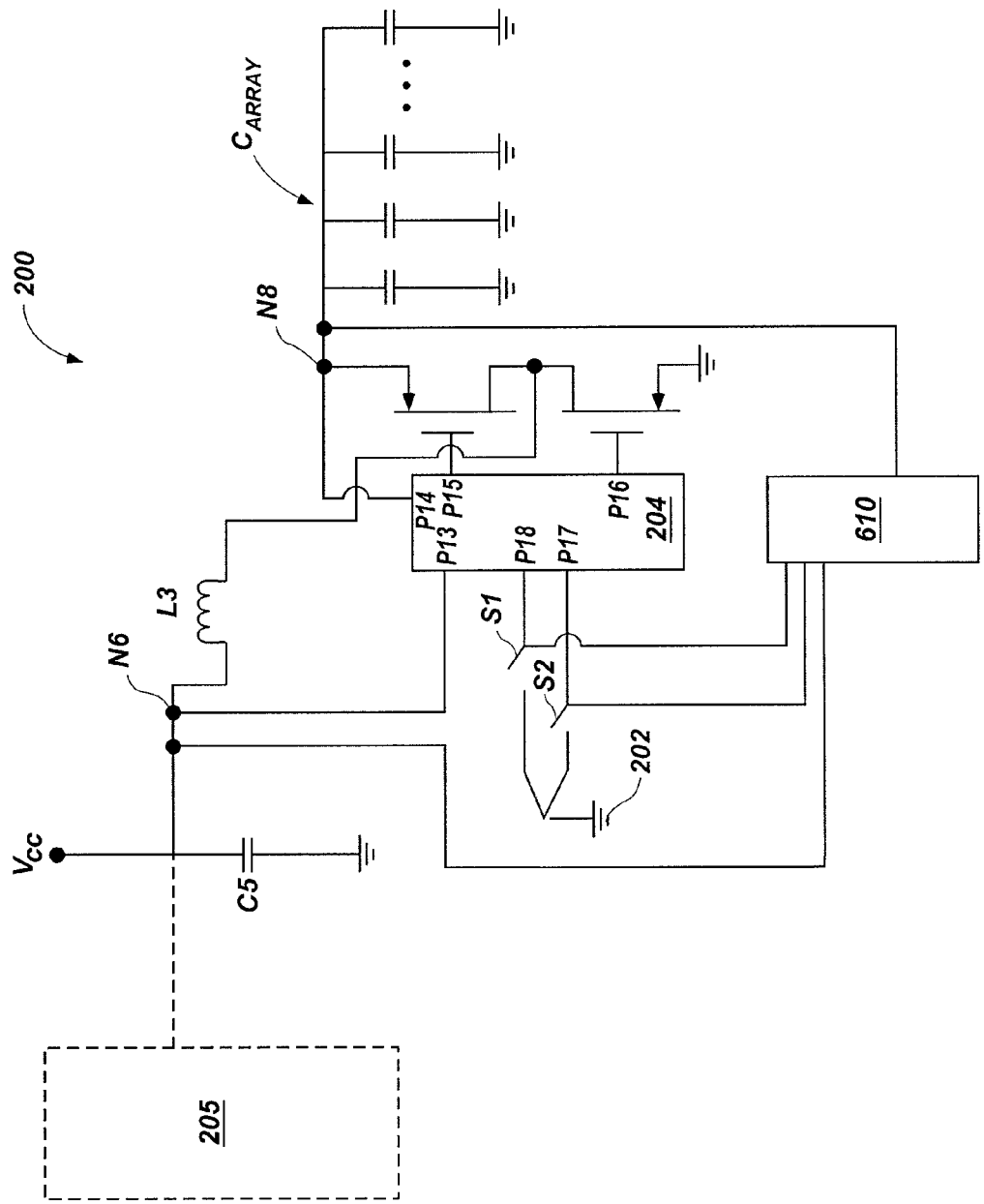
FIG. 14 illustrates a system including a power converter operably coupled to a controller, according to an embodiment of the present invention.

FIG. 13 illustrates another timing diagram having a signal 502, which is an example current level supplied to load 205 during charging boost mode 300 and buck mode 400. As illustrated by signal 502 an oscillating current centered on about 2.85 Å charges the capacitor array $C_{Array}$. After detection of a power loss, current 520 is supplied from the capacitor array $C_{Array}$ to load 205 during buck mode 400. As illustrated in FIG. 13, the current from the capacitor array $C_{Array}$ starts at about 3.2 Å and five milliseconds after detection of a power loss (indicated by reference numeral 350), approximately 2.4 Å of current is being supplied to load 205.

FIG. 15 illustrates an electronic system 600 including an electronic device 602 operably coupled to a data storage device 604, which may comprise any known and suitable data storage device. By way of example only, data storage device 604 may comprise a solid-state device (SSD) or a hard disk drive (HDD). Moreover, data storage device 604 may include volatile memory 606, such as SRAM (static random access memory) or dynamic random access memory (DRAM). The term DRAM should be interpreted for purposes of this disclosure to include any one of a number of DRAM variations such as SDRAM (synchronous DRAM), DDR (double data rate SDRAM), DDR2 (double data rate 2 SDRAM), and equivalents thereof Furthermore, data storage device 604 may include non-volatile memory 608, which may comprise a magnetic disk, flash memory, magnetic tape or the like. Furthermore, electronic system 600 may include power converter 200 according to an embodiment of the invention as described herein above. Power converter 200 may be operably coupled to data storage device 604 and may be configured to convey power to data storage device 604 in an event of a power loss at data storage device 604. By way of example only, power converter 200 may provide backup power to data storage device 604 in the event of a power loss to enable data storage device 604 to complete one or more data operations, such as writing data stored in volatile memory 606 to non-volatile memory 608.

While the present invention has been described herein with respect to certain preferred embodiments, those of ordinary skill in the art will recognize and appreciate that it is not so limited. Rather, many additions, deletions, and modifications to the preferred embodiments may be made without departing from the scope of the invention as hereinafter claimed. In addition, features from one embodiment may be combined with features of another embodiment while still being encompassed within the scope of the invention as contemplated by the inventors.

What is claimed is:

1. A power converter, comprising:
 a capacitor array comprising a plurality of capacitors and configured to store a charge from an input during a charge mode and provide a charge to an output during a discharge mode;
 a capacitor operably coupled between the output and a ground voltage; and
 a controller configured to selectively couple the capacitor array to the input during a portion of the charge mode and selectively couple the capacitor array to the output during a portion of the discharge mode.

2. The power converter of claim 1, wherein the controller comprises a MOSFET driver.

3. The power converter of claim 1, wherein the capacitor array is configured to provide a charge of at least four volts for at least five milliseconds to the output during the discharge mode.

4. The power converter of claim 1, wherein the capacitor array comprises a capacitance of substantially 800 microfarads.

5. The power converter of claim 1, wherein the controller is configured to transition from the charge mode to the discharge mode upon detection of a loss of power at the input.

6. The power converter of claim 1, wherein the controller is configured to selectively couple the capacitor array to the input during the portion of the charge mode and selectively couple the capacitor array to the output during the portion of the discharge mode using common circuitry.

7. A power converter, comprising:
a capacitor array comprising a plurality of capacitors and configured to store a charge from an input during a charge mode and provide a charge to an output during a discharge mode;
a controller configured to selectively couple the capacitor array to the input during a portion of the charge mode and selectively couple the capacitor array to the output during a portion of the discharge mode; and
an inductor configured to be selectively coupled between the input and the capacitor array during the portion of the charge mode and between the capacitor array and the output during the portion of the discharge mode.

8. The power converter of claim 7, wherein the inductor comprises an inductance of substantially near one microhenry.

9. A power converter, comprising:
a capacitor array comprising a plurality of capacitors and configured to store a charge loom input during a charge mode and provide a charge to an output during a discharge mode; and
a controller configured to selectively couple the capacitor array to the input during a portion of the charge mode and selectively couple the capacitor array to the output during a portion of the discharge mode; and
a plurality of transistors, wherein a gate of each transistor of the plurality of transistors is operably coupled to the controller.

10. A power converter, comprising:
a capacitor array comprising a plurality of capacitors and configured to store a charge from an input during a charge mode and provide a charge to an output during a discharge mode; and
a controller configured to selectively couple the capacitor array to the input during a portion of the charge mode and selectively couple the capacitor array to the output during a portion of the discharge mode;
wherein the charge mode comprises a charging boost mode and the discharge mode comprises a discharging buck mode.

11. A method, comprising:
receiving an input voltage at each of a load and a power converter at a first voltage level;
charging a capacitor array within the power converter to a second voltage level greater than the first voltage level by coupling the input voltage to an inductor during one phase and coupling the inductor to the capacitor array during another phase; and
conveying an output voltage from the power converter to the load at a third voltage level less than the second voltage level upon detection of a loss of power supplied to the load.

12. The method of claim 11, wherein conveying the output voltage from the power converter to the load comprises conveying the output voltage from the power converter to one of a solid-state drive and a mechanical hard drive.

13. The method of claim 11, wherein charging the capacitor array within the power converter to a second voltage level comprises charging the capacitor array to a voltage substantially near twenty volts.

14. The method of claim 11, wherein receiving the input voltage at each of the load and the power converter comprises receiving a voltage substantially near five volts as the input voltage at each of the load and the power converter.

15. A method, comprising:
receiving an input voltage at each of a load and a power converter at a first voltage level;
charging a capacitor array within the power converter to a second voltage level greater than the first voltage level and coupling the input voltage to an inductor during one phase and coupling the inductor to the capacitor array during another phase; and
conveying an output voltage from the power converter to the load at a third voltage level less than the second voltage level upon detection of a loss of power supplied to the load by coupling the capacitor array to an inductor during a phase and coupling the inductor to the load during another phase.

16. The method of claim 15, wherein conveying the output voltage from the power converter to the load comprises conveying the output voltage from the power converter to one of a solid-state drive and a mechanical hard drive.

17. The method of claim 5, wherein charging the capacitor array within the power converter to a second voltage level comprises charging the capacitor array to a voltage substantially near twenty volts.

18. The method of claim 15, wherein receiving the input voltage at each of the load and the power converter comprises receiving a voltage substantially near five volts as the input voltage at each of the load and the power converter.

19. A method, comprising:
storing energy from an input in a capacitor array comprising a plurality of capacitors during a first stage, the storing comprising coupling an inductor between an input voltage and a ground voltage during a first phase of the first stage and coupling the inductor between the input voltage and the capacitor array during a second phase of the first stage; and
outputting the energy stored in the capacitor array to a load during a second stage upon detection of a loss of power at the input.

20. The method of claim 19, wherein storing energy in the capacitor array comprises storing a voltage substantially near twenty volts in the capacitor array.

21. The method of claim 19, wherein outputting the energy stored in the capacitor array comprises outputting the energy stored in the capacitor array to a data storage device.

22. A method, comprising:
storing energy from an input in a capacitor array comprising a plurality of capacitors during a first stage; and
outputting the energy stored in the capacitor array to a load during a second stage upon detection of a loss of power at the input;
wherein outputting comprises coupling an inductor between the capacitor array and an output during a first phase of the second stage and coupling the inductor between a ground voltage and the output during a second phase of the second stage.

23. A system, comprising:
an electronic device;
a data storage device coupled to the electronic device; and
a power converter operably coupled to the data storage device and configured to:

store energy in a capacitor array during a first phase comprising a charging boost mode; and convey the energy stored in the capacitor array to the data storage device during a second phase comprising a discharging buck mode.

24. The system of claim 23, wherein the data storage device comprises one of a solid-state drive and a mechanical hard drive.

25. The system of claim 23, further comprising a controller coupled to the power converter and configured to sense a loss of power provided to the data storage device.

26. The system of claim 23, wherein the power converter is further configured to convey the energy stored in the capacitor array to the data storage device upon detection of a loss of power provided to the data storage device.

27. The system of claim 23, wherein the power converter is configured to store energy in a capacitor array during a first phase and convey the energy stored in the capacitor array to the data storage device during a second phase using common circuitry.

* * * * *